April 26, 1960

O. K. KELLEY ET AL 2,934,177

LIQUID COOLED FRICTION BRAKE

Filed June 17. 1955

INVENTORS
OLIVER K. KELLEY
GILBERT K. HAUSE
BURNETTE HECK
BY
Craig V. Morton
THEIR ATTORNEY INVENTORS
OLIVER K. KELLEY
GILBERT K. HAUSE
BURNETTE HECK
BY
Craig V. Morton
THEIR ATTORNEY

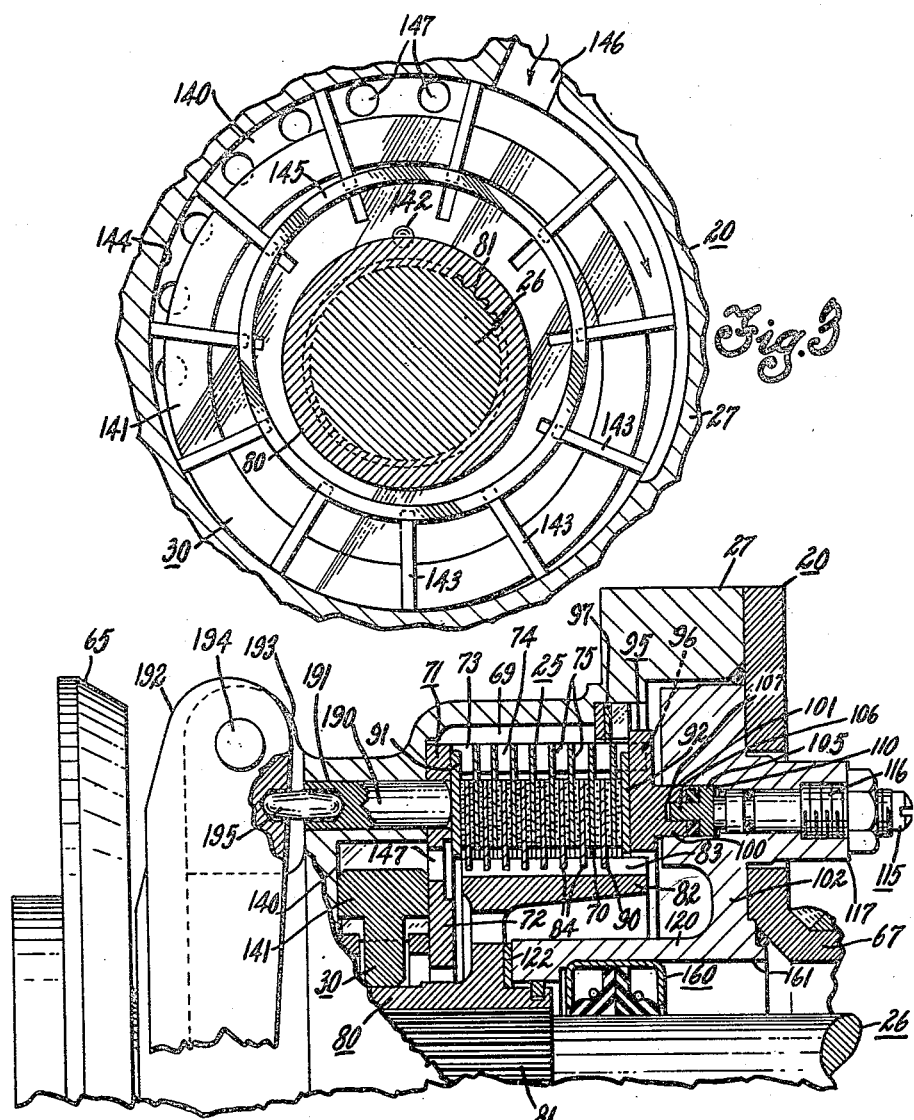

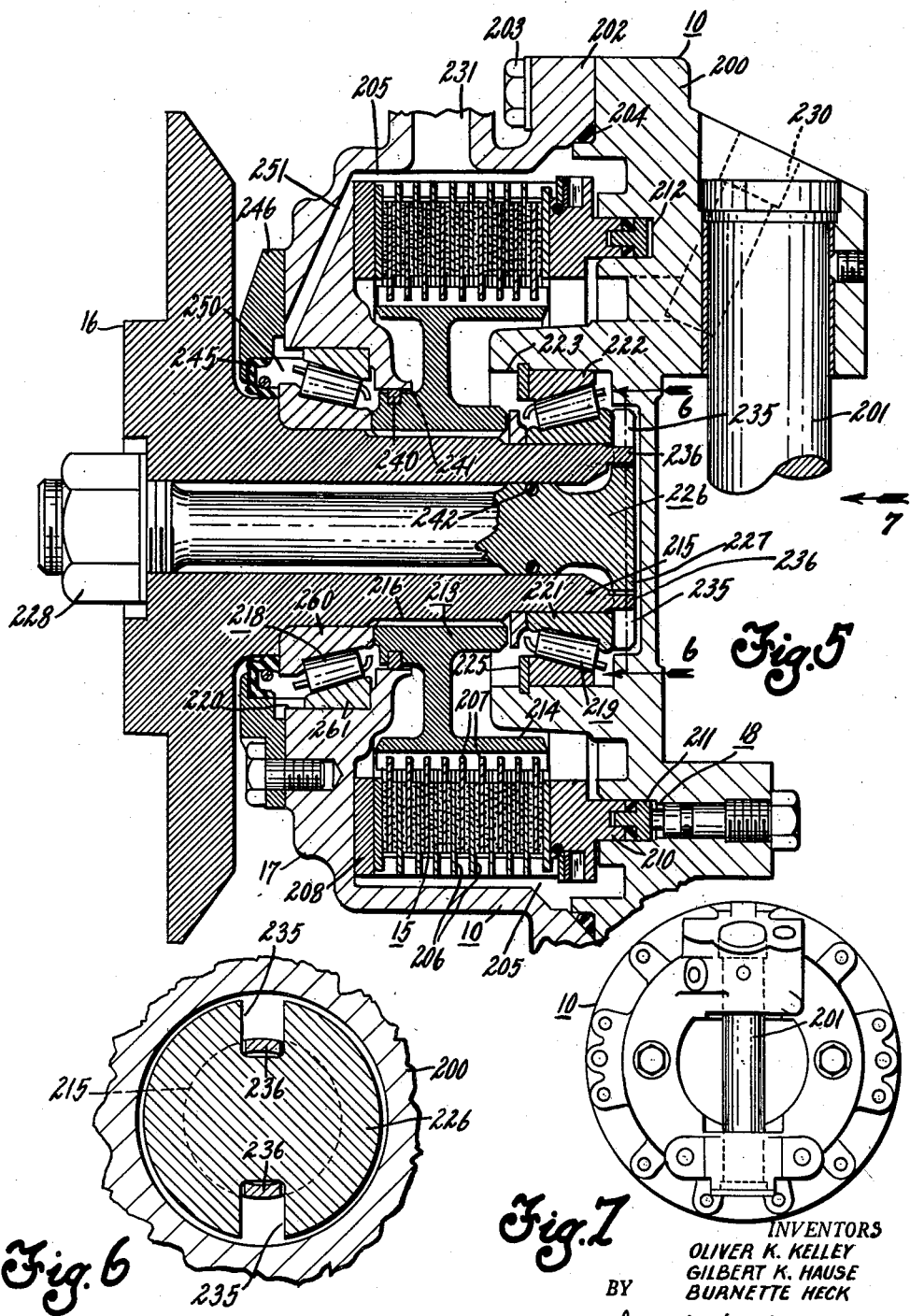

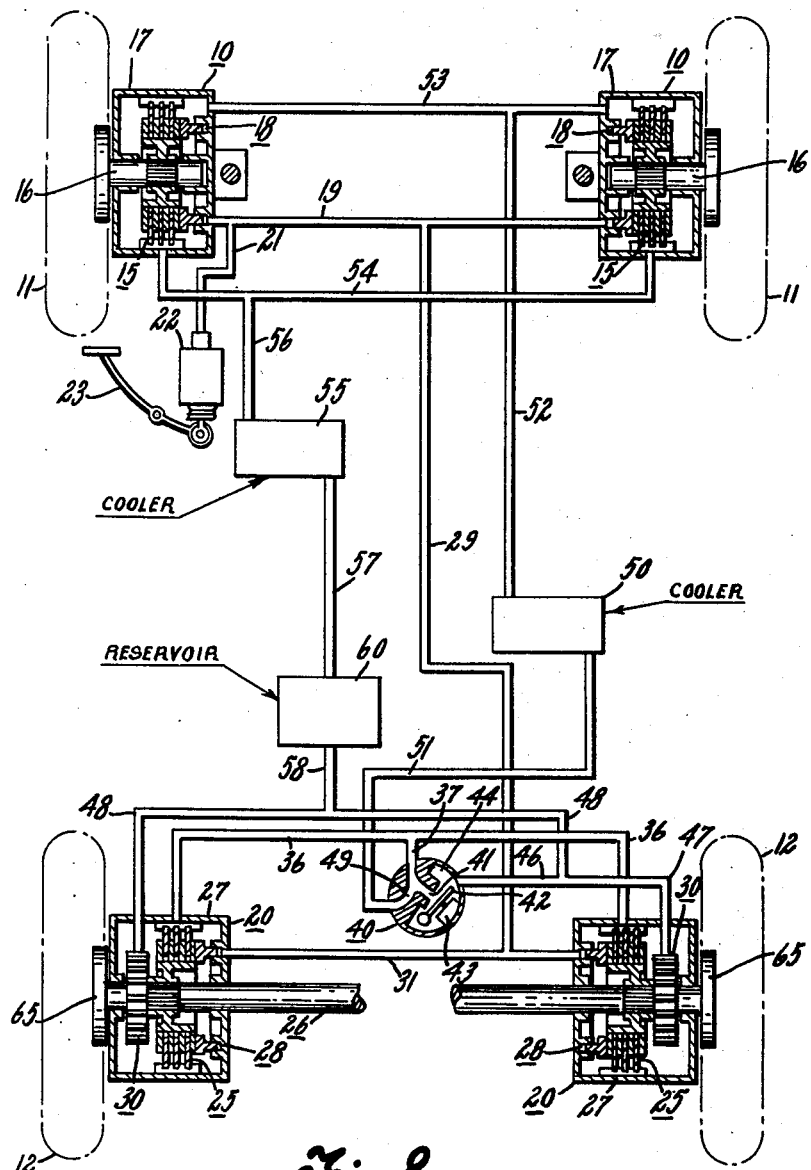

United States Patent Office 2,934,177
Patented Apr. 26, 1960

2,934,177
LIQUID COOLED FRICTION BRAKE

Oliver K. Kelley, Bloomfield Hills, Gilbert K. Hause, Franklin, and Burnette Heck, Detroit, Mich., assignors to General Motors Corporation, Detroit, Mich., a corporation of Delaware Application June 17, 1955, Serial No. 516,282

5 Claims. (Cl. 188—264)

This invention relates to brake mechanisms, and particularly to a brake mechanism adapted for use on motor vehicles wherein the brake mechanism has a cooling liquid circulated through the mechanism to remove the heat generated by brake operation.

An object of the invention is to provide a brake mechanism adapted for circulation of a liquid between the stationary and movable friction elements of the brake mechanism of an improved construction to provide for a smaller diameter of brake and obtain a more uniform operating action of the brake.

Another object of the invention is to provide a friction brake mechanism with a fluid pump carried within the brake for circulating cooling fluid between the friction elements of the brake mechanism, suitable seals being provided to prevent leakage loss of cooling circulating fluid, the brake mechanism being arranged in a manner that the seals are held under a fluid pressure to prevent leakage of air into the cooling fluid circulating system thereby eliminating frothing of cooling liquid.

It is another object of the invention to provide a brake mechanism in accordance with the foregoing object wherein the seal which retains the leakage fluid within the brake mechanism is vented to the lower pressure side of the fluid circulating system whereby at least the pressure of the low pressure side of the circulating system is maintained on the seal.

Further objects and advantages of the present invention will be apparent from the following description, reference being had to the accompanying drawings wherein a preferred form of the invention is clearly shown.

In the drawings:

Figure 3 is a cross sectional view taken along line 3—3 of Figure 1.

Figure 4 is a cross sectional view similar to Fig. 1 but taken in a different plane to illustrate the parking brake actuating mechanism.

Figure 5 is a cross sectional view of a friction brake for the front wheel of a vehicle incorporating features of this invention.

Figure 6 is a cross sectional view taken along line 6—6 of Figure 5.

Figure 7 is an elevational view of the inboard side of the brake assembly illustrated in Figure 5, as taken in the direction of the arrow 7.

Figure 8 is a schematic view of a brake system incorporating the brake structure illustrated in Figures 1 and 5.

Figure 1:
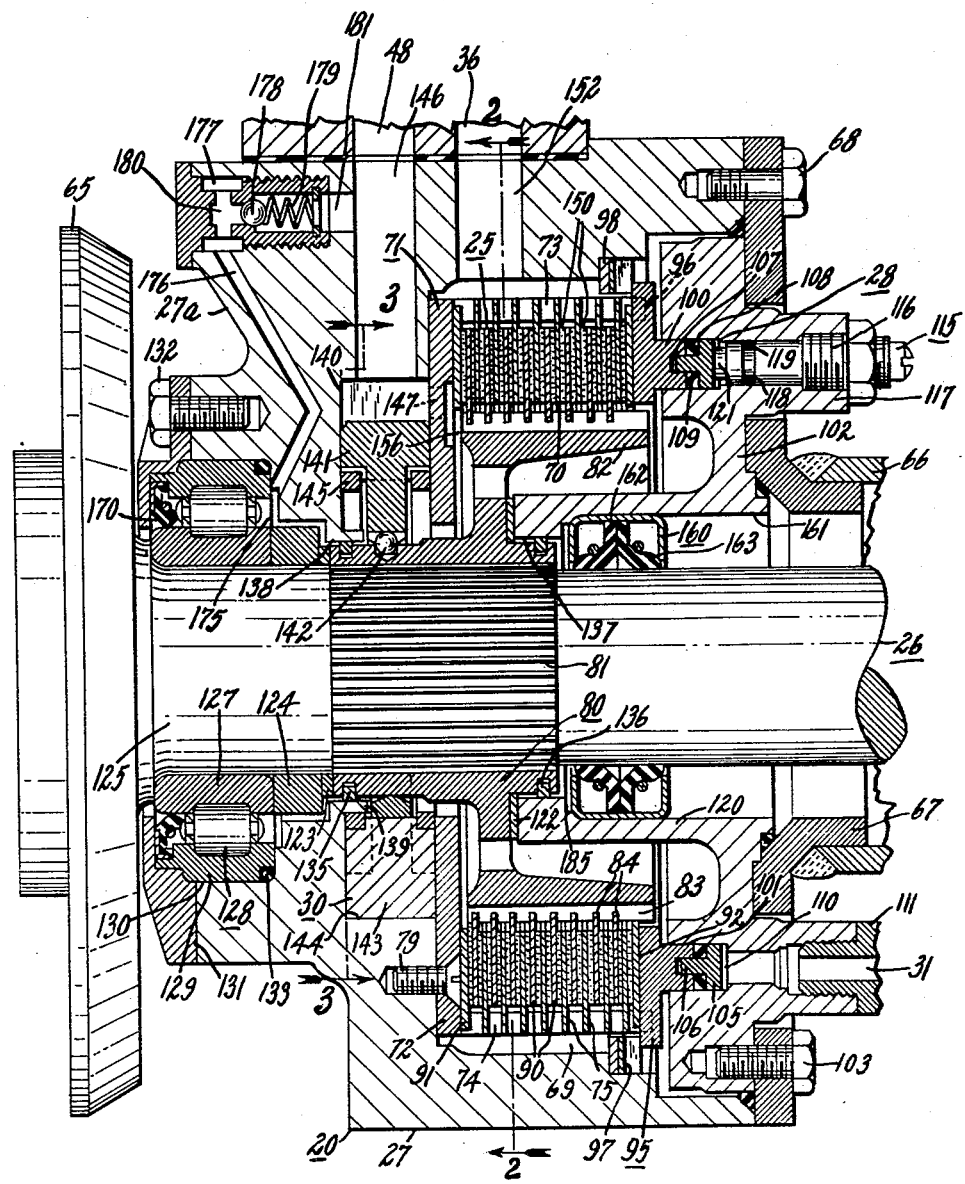
Figure 1 is a transverse cross sectional view of a liquid cooled friction brake for the rear wheel of a vehicle incorporating features of this invention.

In this invention the liquid cooled friction brakes illustrated in Figures 1 and 5 are shown as applied to the rear and front wheels respectively of a vehicle. However, it is not essential that the brake assembly shown in Figure 1 be specifically applied to a rear wheel nor that the assembly of Figure 5 be specifically applied to a front wheel. Obviously the brake assemblies could be reversed as to their wheel positions, the only major difference between the structures being the incorporation of a fluid circulating pump in the brake assembly illustrated in Figure 1 to effect circulation of a cooling fluid through the brakes illustrated in Figures 1 and 5 as incorporated in the system illustrated in Figure 8. The brake system illustrated in Figure 8, while being broadly described herein is more particularly and specifically disclosed and described in the copending application of Oliver K. Kelley, Serial No. 516,294 filed June 17, 1955.

The brake assembly 10 illustrated in Fig. 5 is applied to the front wheels 11 of a motor vehicle while the brake assembly 20 illustrated in Fig. 1 is applied to the rear wheels 12 of the motor vehicle. The brake assemblies 10 for the front wheels of the vehicle each include a multiple disk brake structure 15, some of the disks being carried on the axle spindles 16 and others of the disks being carried by the stationary housing 17. The friction disk assemblies 15 are actuated by hydraulically operated wheel cylinders 18 that are connected by the hydraulic lines 19 and 21 with a master cylinder 22. The master cylinder is operated by the manually actuated brake pedal 23 to supply fluid under pressure to the wheel cylinders 18 and operate the friction brake assemblies 15 in the usual manner of conventional hydraulic actuating brake systems.

The rear wheel assemblies each include a multiple disk friction brake assembly 25 some of which disks are carried on the rear axle 26 and others of the disks are carried on the stationary housing 27. Wheel cylinders 28 are provided in the rear wheel brake assemblies for operation of the multiple friction disk assemblies 25, the wheel cylinders 28 receiving hydraulic fluid under pressure through the lines 29 and 31 to operate the rear wheel disk assemblies 25 concurrently with the front wheel disk assemblies 15 in conventional manner of hydraulic brake actuating systems.

To remove the heat of friction created by a braking operation, a liquid cooling fluid is circulated through the front and rear wheel brakes, the fluid being conducted between the friction disks of the disk assemblies 15 and 25 all in a manner more fully described hereinafter.

General speaking, the rear wheel brake assemblies 20 are each provided with a vane type circulating pump 30 that delivers fluid under pressure into the interior of the stationary brake housing 27 for circulation through the brake disks of the multiple disk assemblies 25. Fluid under pressure is delivered from the stationary housings 27 through the discharge lines 36 that join with the line 37 which enters a temperature responsive valve 40 that responds to the temperature of the cooling fluid in the circulatory system for the brakes. The valve 40 has a by-pass passage 41 that is controlled by a valve member 42 actuated by a thermally responsive device 43. When the passage 41 is open, as illustrated in Figure 8, the flow through the line 37 is into the interior 44 of the valve 40 and thence into the return line 46 for delivery to the suction lines 47 and 48 connected with the pumps 30.

The valve 40 is also provided with an outlet passage 49 that connects with a delivery line 51 that in turn is connected with a heat exchanger or liquid cooler 50. When the valve element 42 closes the passage 41 of the valve 40, the fluid under pressure is delivered from the pressure line 37 and thence into the heat exchanger 50. From the heat exchanger 50 a fluid circulating line 52 connects with the interior of the stationary housings 17 of the front wheel brakes 10 through the line 53. The fluid admitted into the housing 17 circulates through and between the friction disks of the disk assemblies 15 for delivery into the return line 54 and in turn is connected by the fluid circulating line 56 with the heat exchanger or liquid cooler 55. From the heat exchanger 55 a fluid circulating line 57 connects with a reservoir or sump 60, a fluid circulating line 58 connecting the reservoir 60 with the suction line 48 that is connected with the inlet side of the pumps 30.

From the foregoing description it will be apparent that the cooling fluid normally circulates from the pump 30 through the rear wheel brakes 20, through the valve 40 and return to the inlet side of the pump 30. The circulating fluid thus by-passes the coolers 50 and 55 and the front wheel brakes 10. So long as the cooling fluid is below a predetermined temperature the foregoing by-passing fluid circulation is effective. However, when the temperature of the circulating fluid rises above a predetermined value the thermally responsive device 43 closes the valve 42 and thereby causes the fluid to circulate through the lines 49 and 51 to the cooler 50 and thence to the front wheel brakes 10. Thus the fluid heated in the rear wheel brakes is cooled by flow through the heat exchanger 50 before reaching the front wheel brakes. When the fluid exhausts from the front wheel brakes it is delivered into the heat exchanger 55 and is again cooled before delivery to the reservoir so that the fluid in the reservoir is cooled before being returned to the pumps 30.

All of the foregoing is more fully disclosed and described in the copending application of Oliver K. Kelley hereinbefore set forth.

The rear wheel brake 20 is more fully disclosed in Figures 1–4.

The rear axle 26 that includes a wheel flange 65 for mounting of a wheel of a vehicle extends from an axle housing 66 that is connected with the casing of a differential. The axle housing 66 carries a radially extending flange plate 67 suitably welded to the housing 66.

The flange plate 67 supports the housing 27 of the rear wheel brake assembly 20 by means of bolts 68. The housing 27 has a chamber 69 that encloses the multiple friction disk brake assembly 25.

The multiple disk brake assembly 25 comprises a plurality of friction disks 70 that are supported upon a stationary carrier 71 that consists of a radially disposed wall 72 and an axially disposed wall 73. The wall 73 is provided with a plurality of axially extending slots 74 that receive ears 75 extending radially from the friction disks 70 whereby the friction disks 70 are held stationary with the housing 27. The carrier member 71 is stationary with the housing 27, being secured thereto by the machine screws 79.

Internally within the carrier 71 there is provided a hub 80 that is supported upon the axle shaft 26 by means of the splines 81. The hub 80 has an annular peripheral portion 82 provided with a plurality of outwardly projecting teeth 83 that are engaged by inwardly projecting teeth 84 on the brake disks 90 that are alternately spaced with the stationary brake disks 75. The brake disks 90 are thus rotated with the axle shaft 26.

At each end of the multiple disk brake assembly there is provided the wear plates 91 and 92. The disk stack comprises the disks 75 and 90 contained between the radial wall 72 of the carrier 71 and a pressure plate 95 that is in the form of an annulus and provided with notches in its periphery that receive the ends 96 of the annular wall 73 of the carrier 71 whereby the pressure plate 95 will be caused to move axially of the carrier.

A retraction spring 97 is provided between the pressure plate 95 and a retaining ring 98 whereby to normally maintain the pressure plate in the position shown in Fig. 1 in which the brake disks 75 and 90 are in released condition so that the disks 90 can rotate freely relative to the disks 75. The retraction spring 97 is in the form of an annulus having corrugations extending radially of the annulus to form thereby a "wave" type spring.

The pressure plate 95 has an annular projection 100 that extends into an annular groove 101 provided in the closure plate 102 supported on the flange plate 67 by means of the bolts 103. The annular groove 101 also receives an annularly arranged ring type of piston 105 that is generally T-shaped in transverse cross section, the stem 106 of the piston 105 extending into an annular slot 107 in the end of the annular projection 100 on the pressure plate 95. An annular ring seal 108 is provided between the piston 105 and the projection 100 on one side of the stem 106 of the piston and a similar ring seal 109 is provided on the opposite side of the stem 106 within annular spaces provided between the piston 105 and the projection 100.

The annular space 110 between the head of the piston 105 and the bottom of the recess 101 forms an annular chamber providing a wheel cylinder to receive hydraulic fluid under pressure from the line 31 entering a fitting 111. The ring seals 108 and 109 provide for sealing against leakage of fluid from the fluid pressure chamber 69 into the annular space 110 when the brakes are in release condition with the pressure in the chamber 69 being at a higher value than in the wheel cylinder space 110. When hydraulic fluid under pressure is supplied to the line 31 from the master cylinder 22 in the manner hereinbefore described during brake application the seals 108 and 109 prevent fluid leakage from the wheel cylinder space 110 into the chamber 69.

When the brakes are in released condition, and only residual line pressure exists in the wheel space 110, the annular piston is in its extreme right hand position against the adjusting stops 121, as shown in Figure 1. At this time coolant fluid under pressure, as well as the retraction springs 97, urges the pressure plate 95 in a right hand direction against the seals 108 and 109.

The seals 108 and 109 have a transverse cross section that is the same as the transverse cross section has the spaces between the head 105 of the annular piston and the projection 100 on the pressure plate 95. As more clearly illustrated in Fig. 9, the transverse cross section of the seals 108 and 109 is substantially square so that the rubber-like seals will fill substantially completely the entire space in which they are disposed. Thus it will be apparent when brake fluid under pressure is delivered from the master cylinder into the wheel cylinder space 110 that there will be substantially no movement of the annular piston 105 that is not directly transmitted to the pressure plate 100 since the seals 108 and 109 do completely fill the spaces in which they are disposed. Thus there is provided a mechanical arrangement which prevents any loss of brake pedal travel on the initial application of the brakes.

Figures 2, 9:
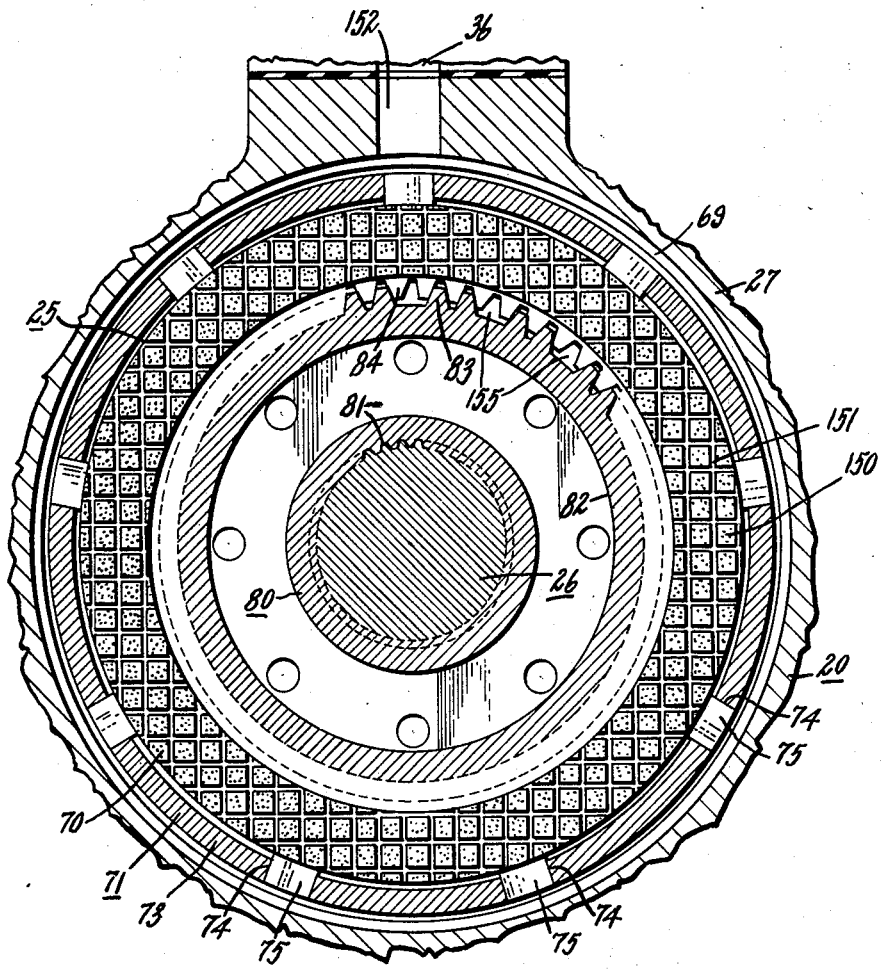
Figure 2 is a cross sectional view taken along line 2—2 of Figure 1.
Figure 9 is an enlarged cross sectional view of a portion of the brake mechanism of Fig. 1 illustrating the seals for the wheel cylinder.

Since it is not practically possible to make each of the seal rings 108 and 109 of exactly the same dimension, manufacturing tolerances preventing this, the axial dimension of one of the seals may be slightly greater than the other. As illustrated in Fig. 9, the axial dimension of the seal member 108 is slightly greater than the axial dimension of the seal member 109. Hence the seal member 108 provides the element that regulates the position of the pressure plate 100 relative to the annular piston 105 and is that element in the stack up of parts that provides the controlling dimension for positioning of the respective parts in establishing the running clearance between the brake disks. Since the seal member 108 will always be directly confined between the projection 100 and the head of the piston 105, and in engagement with each, the result is that there is no loss of brake pedal travel or brake pedal pressure when the brake pedal is initially applied. The seal member 109 is engaged by the head of the piston 105 on application of the brakes as soon as the pressure in the cylinder chamber 110 increases sufficiently to slightly compress the seal member 108, or the seal member 109 may slightly float in its chamber and seal against leakage when fluid enters the clearance space provided by the smaller dimension of the seal member 109.

To provide for adjusting the clearance between the disks 75 and 90 of the brake disk assembly, there is provided a plurality of adjusting screws 115. The adjusting screws comprise a threaded portion 116 in threaded engagement with the boss 117 extending from the closure plate 102 and projecting through the flange plate 67. The forward end of the adjusting screw has an undercut groove 118 that receives an O ring seal member 119 whereby to seal against the leakage of fluid from the wheel cylinder chamber 110. The forward end 121 of the adjusting screw engages the ring piston 105 to limit its movement axially as urged by the retraction spring 97.

The closure plate 102 has a forwardly extending annular wall 120 that engages a thrust washer 122 positioned between the wall 120 and the hub 80. The opposite end of the hub 80 engages a thrust washer 123 that in turn engages a ring 124 that is a press fit on the shaft portion 125 of the axle 26 to retain the inner race 127 of the anti-friction bearing 128 upon the shaft portion 125. The anti-friction bearing 128 includes an outer race 129 that is retained in the recess 130 in the forward end of the housing 27, a retaining plate 131 being fastened to the housing wall 27a by means of the bolts 132 for this purpose. An O ring seal 133 prevents leakage loss of fluid around the outer race 129.

The hub 80 is provided with annular rings 135 and 136 at opposite ends thereof, the ring 136 engaging the annular wall 137 on the inner periphery of the forward extension 120 of the closure plate 102. The ring 135 engages the annular wall 138 provided on the extension 139 of the forward wall 27a of the housing 27. These ring seals 135 and 136 restrict loss of fluid under pressure from the chamber 69 in the housing 27 in a manner hereinafter referred to.

To provide for circulation of cooling fluid through the disk brake assembly, the pump 30 is placed within a pump recess 140 provided in the housing 27, the radial wall 72 of the carrier 71 forming one wall of the pump housing.

As shown in Figures 1 and 3, the pump 30 comprises an annular ring 141 that is generally T-shaped in transverse cross section, the ring 141 being keyed to the hub 80 by means of the ball key 142, shown in Fig. 1. The ring 141 carries a plurality of vanes 143 that are held outwardly in engagement with the pump wall 144 by means of a ring 145. The pump housing 140 is provided with an inlet passage 146 that connects with the line 48 of the fluid circulating system illustrated in Fig. 8. Fluid under pressure is discharged from the pump housing 140 through the discharge ports 147 provided in the radial wall 72 of the carrier 71 for discharge into the chamber 69 radially inwardly of the brake disk assembly comprising the disks 75 and 90, as shown in Fig. 1.

Either of the brake disks 75 or 90, or both, may be provided with friction facings 150, the friction facings having a plurality of grooves 151 therein to provide for flow of fluid from the space interiorly of the disk assembly to the space radially outwardly thereof so that the fluid will discharge through the port 152 into the high pressure line 36 of the fluid circulating sytem shown in Figure 8.

The annular rim 82 of the hub 80 has every third tooth 83 thereof removed, as indicated at 155 to provide for distribution of cooling fluid from the space 156 to between the multiple disk assembly for circulation through the passages 151 in the friction facings 150.

A seal 160 is provided between the axle shaft 26 and the annular wall 161 of the closure plate 102, the seal member 162 sealing against loss of leakage fluid from chamber 69 whereas the seal member 163 seals against grease leakage along the rear axle shaft 26 from the differential.

A seal member 170 is provided at the forward end of the anti-friction bearing 128 to seal against leakage loss of fluid through the anti-friction bearing.

The bearing chamber 175 containing the anti-friction bearing 128 is vented by means of a vent line 176 that connects with the valve chamber 177 containing ball check valve 178 urged against its seat by means of a spring 179, a passage 180 being provided for connecting the chamber 177 through the ball check valve 178 with a passage 181 that communicates with the low pressure or suction side of the fluid circulating system, that is with the line 48 or the port 146, as shown in Figure 1.

Fluid under pressure delivered from the pump 30 into the space 156 and thus into the chamber 69 of the housing 27 has leakage tendency along the thrust bearing 122 and through the ball key connection 142 that is restricted by the seal rings 135 and 136 so as to prevent high pressure leakage past the seal rings. However, some fluid leakage will occur past the seal rings 135 and 136 and will enter the space 185 in advance of the seal member 162. The leakage fluid in the space 185 is vented through the spline 81 and up past the thrust ring 123 into the chamber 175 to prevent a high pressure developing in the chamber 185 that would tend to force fluid past the seal 162. However, the pressure that does exist in the chamber 185 tends to maintain the seal 162 under the pressure in the chamber to effect substantial sealing on the shaft 26.

The ball check valve 178 that is spring urged on its seat permits pressure to build up in the vent line 176 and in the bearing chamber 175 equal to the value of the spring adjustment 179 that is held to a value just at or slightly above atmospheric pressure so that the fluid pressure in the chamber 175 acting on the seal 170 will maintain this seal under pressure at all times irrespective of the pressure in the line 146, which at times drops below atmosphere, to thereby prevent leakage of air past the seal 170 that would ultimately be drawn into the cooling fluid circulating system and result in a frothing of the cooling fluid.

In Figure 4 there is illustrated a manual means for operating the brake disk assembly comprising the disks 75 and 90 to effect a parking brake operation. The wear plate 91 is engaged by a pin 190 slidable in an opening 191 provided in the housing 27. A manually operated lever 192 is pivoted to the housing boss 193 by means of a pivot pin 194. A link pin 195 is disposed between the lever 192 and the pin 190 to effect reciprocal movement of pin 190 upon rotation of the lever 192 about its pivot pin 194.

The lever 192 is connected with the cable actuating mechanism operated by the parking brake lever of a motor vehicle so that upon actuation thereof the disks 75 and 90 will be brought into engagement by the pin 190. It will be noted in Fig. 4 that the actuating pin 190 is substantially coaxially aligned with an adjusting screw 115 whereby the adjusting screw takes the thrust of the movement of the disks against the pressure plate 95.

In Figure 5 there is illustrated in detail a front brake assembly 10 used in the brake system illustrated in Fig. 8. The front brake assembly is essentially like the rear brake assembly except that the pump 30 of the rear brake assembly illustrated in Figure 1 is omitted from the front brake assembly. In the brake assembly illustrated in Fig. 5 there is provided a housing part 200 forming a support for a kingpin 201. The housing 200 has another housing part 202 secured thereto by means of bolts 203 with a joint between the housing sealed by an O ring member 204. The housing parts 200 and 202 form a chamber 205 comparable to the chamber 69 of the rear brake assembly heretofore described that contains a multiple disk brake assembly comprising stationary disks 206 and rotatable disks 207 comparable to the disks 75 and 90 of the assembly illustrated in Figure 1.

The stationary disks 206 are supported upon a carrier 208 that is attached to the housing part 202 in any suitable manner. The carrier 208 has the forward end thereof engaging a pressure plate 209 that is comparable to the pressure plate 95 of the rear brake assembly, the pressure plate containing an annular projection 210 that carries a ring type piston 211 in the same manner as that illustrated in Fig. 1. The piston 211 is disposed in the recess groove 212 that forms the wheel cylinder of a hydraulic brake actuating system in the same manner as the cylinder 110 disclosed in Figure 1.

The rotatable disks 207 are carried upon a hub 213 having an annular rim 214 that supports the disks 207 upon a tooth structure like that disclosed in Figure 2.

The hub 213 is splined upon an axle spindle 215 by the spline connection 216 and is journaled in the anti-friction bearings 218 and 219 supported in the housing parts 202 and 200 respectively. The axle spindle 215 carries the inner race 260 of the anti-friction bearing 218, the outer race 261 being supported in a recess 260 in the housing part 202. The anti-friction bearing 219 also has its inner race 221 supported upon the axle spindle and its outer race 222 supported in an annular recess 223 in the housing part 200, the annular race 222 engaging a snap-ring 225 that retains the entire spindle assembly within the housing 202 and 200.

The axle spindle 215 carries a stud bolt 226 that has a radial flange 227 at the end thereof engaging the inner race 221 of the anti-friction bearing 219. When the nut 228 is tightened upon the stud bolt 226, the anti-friction bearings 218 and 219 which are of the taper bearing category are urged outwardly against their outer races 261 and 222 and are thereby held in the housing 202—200 by means of the snap-ring 225. The flange 227 is provided with slots 235 that receive tongues 236 projecting from the spindle 215 to prevent rotation between the stud bolt 226 and the spindle.

Brake cooling fluid is delivered into the chamber 205 interiorly of the multiple disk brake assembly through the fluid inlet port 230 that connects with the line 53 of the circulating system illustrated in Fig. 8. From the chamber interiorly of the brake disk assembly, the cooling fluid is circulated between the disks in the same manner as heretofore described with reference to the structure of Fig. 1 and is discharged through the port 231 that connects with the line 54 of the fluid circulating system illustrated in Fig. 8.

A ring seal 240 is provided between the hub 213 and the annular wall 241 of the housing 202 to provide a resistance seal against leakage of fluid under pressure from the chamber 205 interiorly of the disk brake assembly. An O ring seal 242 is provided between the stud bolt 226 and the spindle 215 to prevent leakage loss of fluid from the chamber 205. A third seal 245 is provided between the end closure plate 246 and the spindle 215 on the outboard side of the anti-friction bearing 218 to prevent loss of fluid at this point.

Cooling fluid from the chamber 205 interiorly of the brake disk assembly 206—207 can seep through the spline connection 216 into the chamber 250 containing the anti-friction bearing 218 and thereby build pressure against the seal 245. To relieve this pressure, a vent passage 251 is provided from the chamber 250 to the low pressure port 231 in the housing 202 so that only a minimum pressure will stand against the seal 245. However, this minimum pressure is substantially above atmospheric pressure since there is a resistance to flow of fluid from the front wheel brakes existing in the circulating lines 54, 56, the heat exchanger 55 and the line 57 to the reservoir 60. Thus with a positive pressure in the vent line 251 and the chamber 250, leakage of air into the low pressure side of the fluid circulating system is effectively prevented.

While the form of embodiment of the invention as herein disclosed constitutes a preferred form, it is to be understood that other forms might be adopted as may come within the scope of the claims which follow.

What is claimed is as follows:

1. In a liquid cooled friction brake, the combination of, means forming a stationary housing, rotatable axle means in said housing, anti-friction bearing means between said housing means and said axle means supporting said axle means within said housing means, cooperating stationary and rotatable means within said housing some of which connect with said axle means and others with said housing means and engageable to effect brake means, said brake means dividing said housing means into two chambers one of which is radially inward of the brake means and around the axle means and the other is radially outward of the brake means, means providing passage means for circulation of cooling fluid through said housing means and said brake means with delivery of fluid under pressure into the said chamber radially inward of said brake means, a first seal means between said housing means and said axle means on the axially inward side of said anti-friction bearing means restricting leakage of cooling fluid on each of the two sides of said chamber radially inward of the brake means, a second seal means between said housing means and said axle means exterior of said first seal means and exterior of said anti-friction bearing means preventing leakage of fluid from the chamber containing said bearing means, and pressurized vent passage means connecting with bearing chamber means between the said first and second seal means with the lower pressure side of the fluid circulating passage means to maintain fluid pressure on the seal means and vent fluid leakage from the bearing chamber between the said first and second seal means into the low pressure side of the pump.

2. A liquid cooled friction brake in accordance with claim 1 that includes check valve means in said vent passage means to maintain fluid pressure in said vent passage means of a predetermined value acting on said second seal means.

3. In a liquid cooled friction brake, the combination of, means forming a stationary housing, rotatable axle means in said housing, anti-friction bearing means between said housing means and said axle means supporting said axle means in said housing means, cooperating stationary and rotatable disk means within said housing some of which connect with said axle means and others with said housing means and engageable to effect brake means, said brake means dividing said housing means into two chambers one of which is radially inward of the brake means and around the axle means and the other radially outward of the brake means, rotatable fluid pump means in said housing and drivingly connected with said axle means, said pump means delivering fluid under pressure into said chamber means radially inward of the brake means, means forming a fluid exhaust passage from said chamber radially outward of the brake means, means forming a fluid inlet passage for said pump means, a first seal means between said housing means and said axle means on the axially inward side of said antifriction bearing means to effect restricted fluid leakage from each of the two sides of said chamber radially inward of said brake means, a second seal means between said housing means and said axle means exterior of said first seal means and exterior of said anti-friction bearing means, a bearing chamber containing said bearing, vent passage means connecting said bearing chamber means between the aforesaid first and second seal means and said inlet passage means for said pump, and check valve means in said vent passage means to maintain fluid pressure in said vent passage means above the value of the fluid pressure in said inlet passage.

4. In a liquid cooled friction brake, the combination of, means forming a stationary housing having an annularly arranged chamber, rotatable axle means in said housing on the axis of the chamber, anti-friction bearing means between said housing means and said axle means supporting the axle in the housing, a hub member keyed on said axle means and having an annular rim within said chamber and an annular portion at each end, cooperating stationary and rotatable disk means forming an assembly within said chamber some of which are carried by said rim and others are carried by said housing and engageable to effect brake means, rotary pump means within said housing and drivingly connected with said axle means, said brake means dividing said chamber into two compartments one radially inward and the other radially outward of the brake means, means forming passage means for delivery of fluid under pressure from said pump means into said chamber radially inward of said brake means, means forming passage means for exhaust of fluid from said chamber radially outward of said brake means, means forming fluid inlet means to said pump, resilient ring seal means between each opposite annular end portion of said hub and said housing to resist leakage flow of fluid under pressure from said chamber, seal means between said housing means and said axle means exterior of said ring seal means to prevent leakage of fluid under pressure from said housing, and vent passage means connecting the chamber containing said axle seal means with said inlet passage means of said pump and including check valve means to maintain a predetermined fluid pressure in said vent passage means.

5. In a liquid cooled friction brake, the combination of, means forming a stationary housing having an annularly arranged chamber, rotatable axle means in said housing on the axis of the chamber and extending through said housing, anti-friction bearing means between said housing means and said axle means supporting the axle in the housing, a hub member keyed on said axle means and having an annular portion at each end of the hub member, cooperating stationary and rotatable disk means forming an assembly within said chamber some of which disk means are carried by said hub and others are connected with said housing and engageable to effect brake means, pumping means and passage means for delivery of fluid under pressure into said housing chamber for circulation through said brake means, passage means for return of fluid from said braking means to said pumping means, resilient ring seal means between each of said opposite annular end portions of said hub and said housing to resist leakage flow of fluid under pressure from said housing chamber, seal means between said axle means and said housing on the exterior side of each of said ring seal means, means forming vent passage means between the chambers containing said last mentioned seal means and said input side of said pumping means.

References Cited in the file of this patent

UNITED STATES PATENTS

| | | |
|---|---|---|
| 2,202,137 | Brown | May 28, 1940 |
| 2,369,249 | Rainalter | Feb. 13, 1945 |
| 2,471,858 | Bloomfield | May 31, 1949 |
| 2,526,236 | Ingres | Oct. 17, 1950 |
| 2,682,320 | Chamberlain et al. | June 29, 1954 |
| 2,695,080 | DuBois | Nov. 23, 1954 |
| 2,730,202 | DuBois | June 10, 1956 |
| 2,835,357 | Kelley et al. | May 20, 1958 |

FOREIGN PATENTS

| | | |
|---|---|---|
| 163,649 | Australia | June 27, 1955 |